United States Patent [19]

Bouvier

[11] Patent Number: 4,676,012
[45] Date of Patent: Jun. 30, 1987

[54] THREE POINT HITCH ROCK AND ROOT PULLER

[76] Inventor: Eugene Bouvier, P.O. Box 36, Lisieux, Saskatchewan, Canada, S0H 2R0

[21] Appl. No.: 783,673

[22] Filed: Oct. 3, 1985

[30] Foreign Application Priority Data

Oct. 4, 1984 [CA] Canada .................................. 464724

[51] Int. Cl.⁴ .............................................. E02F 5/00
[52] U.S. Cl. ...................................... 37/2 R; 172/450; 172/449; 171/82
[58] Field of Search ............... 172/699, 700, 449, 450, 172/748, 447; 37/2 R; 171/82

[56] References Cited

U.S. PATENT DOCUMENTS

| | | | |
|---|---|---|---|
| 2,734,290 | 2/1956 | Tuttle | 172/540 X |
| 2,806,303 | 9/1957 | Boyle | 37/2 R |
| 2,877,572 | 3/1959 | Dyess | 37/2 R |
| 2,880,526 | 4/1959 | Monson | 37/2 R |
| 3,148,738 | 9/1964 | Shelton | 172/699 |
| 3,523,586 | 8/1970 | Kubecka | 172/699 |

OTHER PUBLICATIONS

Three-Point Subsoilers Advertizing brochure of Taylor Implement Div., Athens, Tenn.
Farm Implement and Machinery Review, p. 1074, 2/1949.

Primary Examiner—Richard J. Johnson
Attorney, Agent, or Firm—Stanley G. Ade; Adrian D. Battison

[57] ABSTRACT

A pair of cultivator shanks are secured together in side-by-side relationship and pivotally connected by the upper end thereof to a three point hitch assembly of a tractor. Check chains limit the sideways swinging movement and the most important aspect of the device is that it is not the power of the tractor which is essential, but the hydraulic lift generated by the hitch which is used to roll relatively large rocks from out of the ground.

9 Claims, 2 Drawing Figures

THREE POINT HITCH ROCK AND ROOT PULLER

BACKGROUND OF INVENTION

This invention relates to new and useful improvements in rock and root pulling devices.

Conventionally, such devices consist of a relatively heavy duty prong secured to the rear of a tractor and which is maneuvered to engage a submerged or partially submerged rock whereupon the power of the tractor is utilized to endeavour to pull or roll the rock from the ground.

Alternatively, a front end loader bucket is often used for such purposes or the heavy duty prong is attached to the leading edge of a front end loader.

All of these devices are unsatisfactory and rely primarily upon the power of the tractor for the rock or root disengagement.

The present device overcomes such disadvantages by providing a heavy duty prong assembly attachable to the three point hydraulic hitch assembly of a tractor so that the hydraulic power of the three point hitch assembly may be used rather than the power of the tractor in order to roll the rock or root from the ground.

In accordance with the invention there is provided in combination with a three point hydraulic hitch assembly of a tractor, a rock pulling device, said device including a resilient, arcuately curved rock engaging prong assembly, means operatively connecting same to the three point hitch assembly, said prong assembly being pivotally attached for limited sideways pivotal movement to said three point hitch assembly.

Another aspect of the invention is to provide a rock pulling device for use with a three point hydraulic hitch assembly of a tractor comprising in combination a resilient, arcuately curved prong assembly and means for attaching same to the associated hydraulic hitch assembly, said means including a transverse member for attachment to the outer ends of the pair of spaced and parallel lift arms of the hitch assembly, said prong assembly being pivotally secured by the upper end thereof to intermediate the ends of said transverse member and means to limit the sideways movement of said prong assembly relative to said transverse member.

Another advantage of the invention is to provide a device of the character herewithin described which is simple in construction, economical in manufacturing, otherwise well suited to the purpose of which it is designed.

With the foregoing in view, and other advantages as will become apparent to those skilled in the art to which this invention relates as this specification proceeds, the invention is herein described by reference to the accompanying drawings forming a part hereof, which includes a description of the best mode known to the Applicant and of the preferred typical embodiment of the principles of the present invention, in which:

DESCRIPTION OF THE DRAWINGS

In the drawings like characters of reference indicate corresponding parts in the different figures.

BRIEF DESCRIPTION OF THE INVENTION

Figure 1:
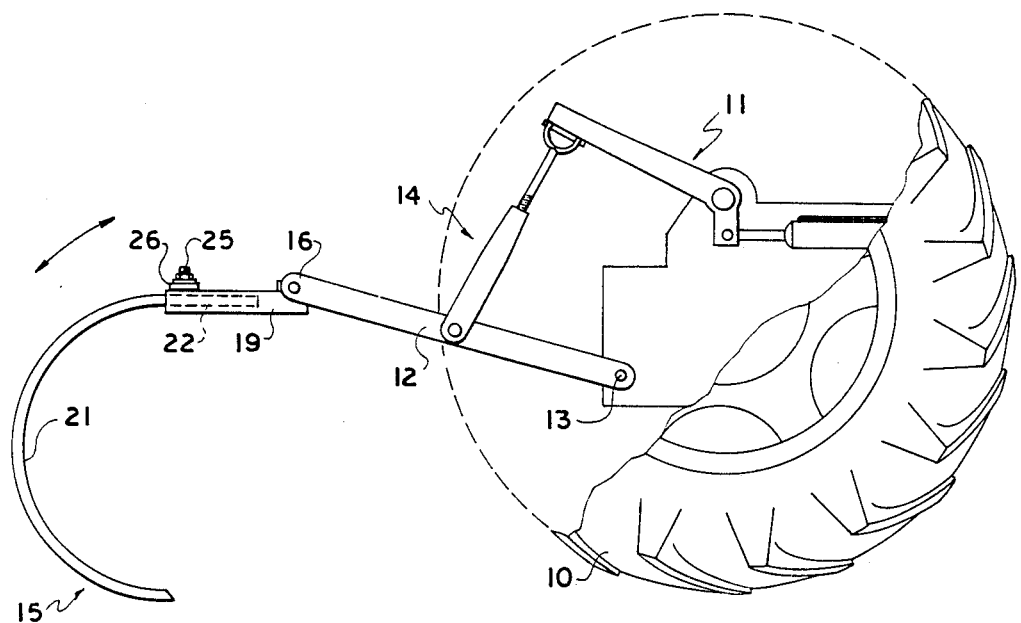
FIG. 1 is a side elevation of the rear end of a tractor with the device secured thereto in combination.
Figure 2:
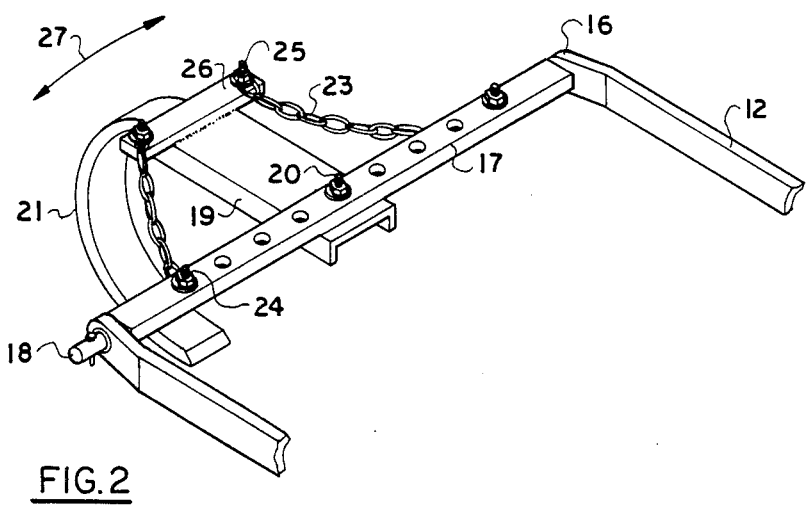
FIG. 2 is an isometric view of the device secured to the two lift arms of a three point hitch assembly.

Proceeding therefore to describe the invention in detail, reference character 10 illustrates the rear of a tractor having a conventional three point hitch assembly collectively designated 11 secured thereto. This hitch assembly includes the pair of spaced and parallel lift arms 12 pivoted to the cross member of the tractor frame by means of pivot pin 13 and actuated by the lift mechanism collectively designated 14.

A resilient, arcuately curved prong assembly collectively designated 15 is operatively connected to the outer or distal ends 16 of the lift arms 12 by means of a transverse beam or member 17 extending between the distal ends 16 of the lift arms and being detachably secured thereto by means of bolts 18.

A channel member 19 is pivotally secured intermediate the ends of the beam 17 by means of pivot bolt assembly 20 and it will be noted that this beam 17 is multi-apertured so that any one of the apertures may be used to attach the channel member 19 depending upon circumstances.

The prong assembly 15 consists preferably of a pair of resilient, arcuately curved cultivator shanks 21 welded together in side-by-side relationship and welded into the channel member 19 by the upper ends 22 thereof with shanks extending rearwardly, and then curving downwardly and slightly forwardly as clearly shown.

Means are prevented to limit the sideways swinging movement of the shank assembly relative to the beam 17, said means taking the form of short lengths of chain or cable 23 secured by the forward ends thereof as by bolt 24, one each to the corresponding end of the transverse beam 17. These chains then extend rearwardly and are secured by means of bolts 25, one each to adjacent the distal ends of a transverse member 26 welded to the top surface of the rear end of the channel 19 and extending upon either side thereof. This assembly allows the prong assembly to swing from side to side in the direction of double headed arrow 27 and the amount can be controlled by the positioning of the chains or cables 23 in any one of the apertures within the beam 17.

In operation, the prong assembly is controlled vertically by means of the hydraulic three point hitch assembly and engages freely under rocks embedded or partially embedded in the ground due to the pivotal attachment of the member 17 and the curvature of the prong or prongs, whereupon the three point hitch assembly is utilized in conjunction with forward movement of the tractor where necessary, in order to lift and roll the rock clear of the ground and this utilization of the lifting action of the three point hitch assembly which, of course, is actuated hydraulically, enables relatively large rocks to be moved with a relatively small tractor.

The device is easily detached when not required so that the three point hitch assembly can be used in a conventional manner.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What is claimed is:

1. In combination with a hydraulic hitch assembly of a tractor, a rock pulling device, said device including a resilient rearwardly and downwardly extending, arcuately curved rock engaging prong assembly, having a forwardly extending lower end portion, means operatively connecting same to the hitch assembly, said prong assembly being freely pivotally attached to a transverse bar for limited sideways pivotal movement in a horizontal plane and for downward pivotal movement relative to said hitch assembly, said hitch assembly including a pair of spaced and parallel lift arms, said means operatively connecting the said prong assembly to said lift arms including pivot means on the ends of said transverse bar member pivotally connected to the distal ends of the spaced and parallel lift arms, said prong assembly being pivotally secured by the upper end thereof intermediate the ends of said transverse bar member and pivotally attached for free movement in a vertical plane to the ends of said lift arms.

2. The invention according to claim 1 which includes means to limit the sideways pivotal movement of the said prong assembly.

3. The invention according to claim 2 in which said means to limit the sideways pivotal movement of said prong assembly includes a check chain extending from each side of said upper end of said prong assembly, and extending, one each, to adjacent the corresponding end of said transverse member.

4. The invention according to claim 2 in which said prong assembly comprises a pair of resilient, arcuately curved cultivator shanks welded together in side-by-side relationship.

5. The invention according to claim 1 in which said prong assembly comprises a pair of resilient, arcuately curved cultivator shanks welded together in side-by-side relationship.

6. A rock pulling device for use with the lift arms of a three point hydraulic hitch assembly of a tractor comprising in combination a resilient, rearwardly and downwardly extending, arcuately curved prong assembly having a forwardly extending lower end portion, and means for attaching same to the associated hydraulic hitch assembly, said means including a transverse bar member having pivot means for pivotal attachment to the outer ends of the pair of spaced and parallel lift arms of the hitch assembly, said prong assembly being pivotally secured by the upper end thereof intermediate the ends of said transverse bar member for sideways swinging movement in a horizontal plane and for free upward and downward pivotal movement in a vertical plane about the pivotal attachment to the ends of said lift arms, and means to limit the sideways swinging movement of said prong assembly relative to said transverse member.

7. The invention according to claim 6 in which said means to limit the sideways swinging movement of said prong assembly includes a check chain extending from each side of said upper end of said lift arm one each to adjacent of the corresponding end of said transverse member.

8. The invention according to claim 7 in which said prong assembly comprises a pair of resilient, arcuately curved cultivator shanks welded together in side-by-side relationship.

9. The invention according to claim 6 in which said prong assembly comprises a pair of resilient, arcuately curved cultivator shanks welded together in side-by-side relationship.

* * * * *